No. 749,186. PATENTED JAN. 12, 1904.
W. J. HAGMAN.
MULTIPLE SPEED GEARING.
APPLICATION FILED NOV. 2, 1903.
NO MODEL. 2 SHEETS—SHEET 1.

Witnesses:
Elmer R. Shipley.
M. S. Belden.

William J. Hagman Inventor
by James W. See
Attorney

No. 749,186. PATENTED JAN. 12, 1904.
W. J. HAGMAN.
MULTIPLE SPEED GEARING.
APPLICATION FILED NOV. 2, 1903.
NO MODEL. 2 SHEETS—SHEET 2.

Witnesses:
Elmer R. Shipley.
M. S. Belden.

William J. Hagman
Inventor.
by James W. See.
Attorney

No. 749,186. Patented January 12, 1904.

UNITED STATES PATENT OFFICE.

WILLIAM J. HAGMAN, OF PHILADELPHIA, PENNSYLVANIA, ASSIGNOR TO NILES-BEMENT-POND COMPANY OF JERSEY CITY, N. J.

MULTIPLE-SPEED GEARING.

SPECIFICATION forming part of Letters Patent No. 749,186, dated January 12, 1904.

Application filed November 2, 1903. Serial No. 179,444. (No model.)

*To all whom it may concern:*

Be it known that I, WILLIAM J. HAGMAN, a citizen of the United States, residing at Philadelphia, Philadelphia county, Pennsylvania, (post-office address, care Bement, Miles & Company, Philadelphia, Pennsylvania,) have invented certain new and useful Improvements in Multiple-Speed Gearing, of which the following is a specification.

This invention pertains to multiple-speed gearing of the turret type invented by B. F. Burdick (see United States Patent No. 537,816, of April 23, 1895) and will be readily understood from the following description, taken in connection with the accompanying drawings, in which—

Figure 1:
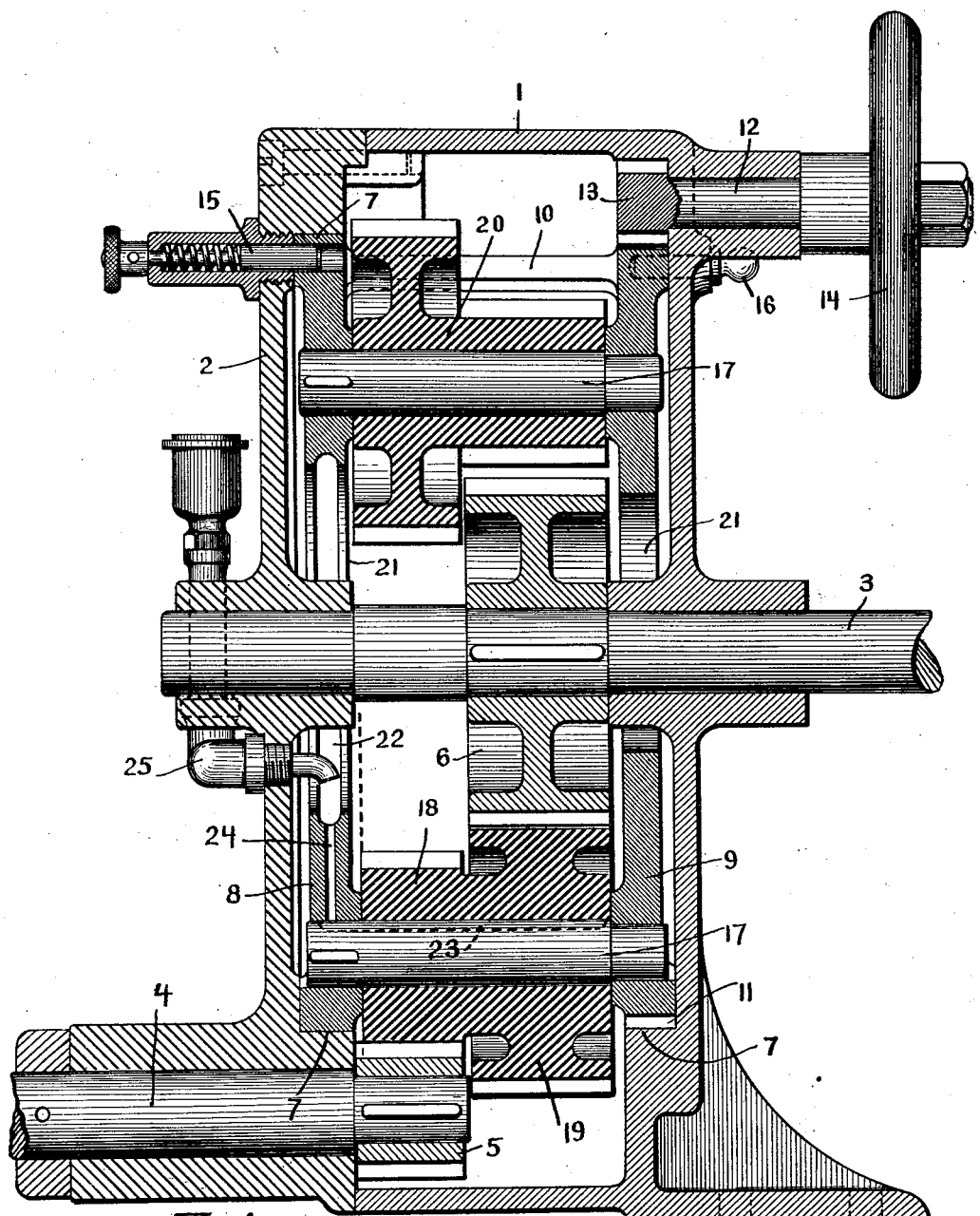
Figure 2:
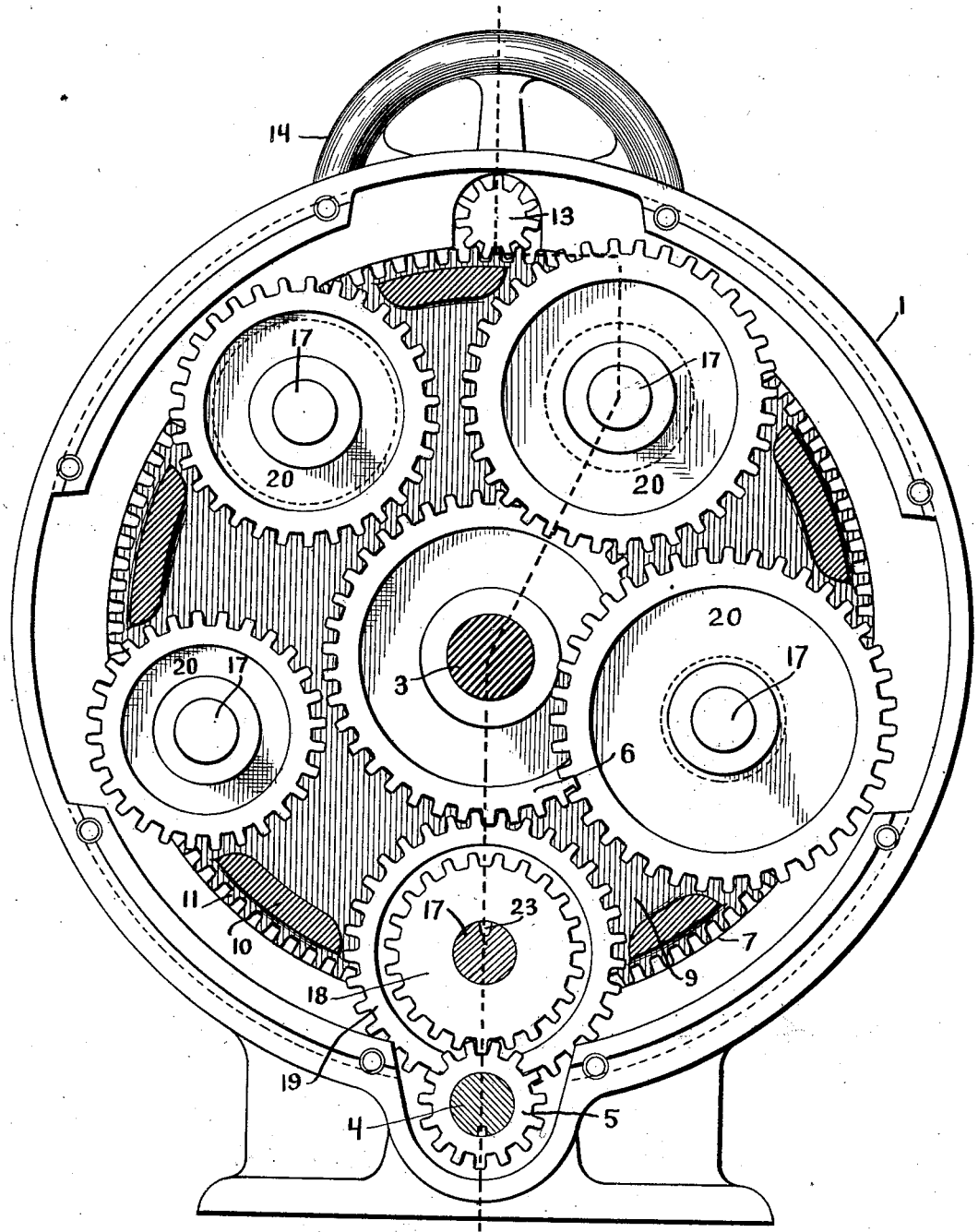

Figure 1 is a vertical diametrical section of a construction embodying my improvements; and Fig. 2, a face view of the same with the bonnet removed and with the front disk of the gear-cage cut away, exposing the cage-struts in section.

In the drawings, 1 indicates an open-faced casing of cylindrical form designed to be secured in convenient association with the machine or machines in connection with which the device is to be used; 2, the removable bonnet of the casing; 3, the driven shaft to which selective speeds are to be transmitted, this shaft being journaled in the side walls of the casing and at about the axis thereof; 4, the driving-shaft, journaled in the bonnet parallel with the driven shaft and at some distance from the driven shaft; 5, a pinion disposed within the casing and fast on driving-shaft 4, this pinion being the driving-pinion of the system; 6, a gear fast on driven shaft 3 and constituting the driven gear of the system, pinion 5 and gear 6 being in different planes; 7, large counterbores on the inner flat walls of the casing, these counterbores forming the bearings for the gear-cage and being eccentric to the driven shaft 3, the axial center of these bearings being closer to driving-shaft 4 than is the axial center of driven shaft 3; 8, a disk with its periphery journaled in one of these bearings; 9, a much similar disk journaled in the other bearing; 10, struts uniting the two disks and, with the disks, forming a substantial cage for carrying the selective gears; 11, a circle of gear-teeth upon the periphery of disk 9, the presence of these teeth not interfering with the journal character of the disk; 12, a spindle journaled in that wall of the casing which supports disk 9, this spindle being parallel with the axis of the cage and outwardly beyond the periphery of disk 9; 13, a pinion fast with spindle 12 and meshing with the teeth of disk 9; 14, a hand-wheel fast with spindle 12; 15, a spring detent-pin mounted in the bonnet and adapted to engage detent-holes in disk 8 and serve in holding the cage in selected angular position, a detent-hole to be provided in the disk for each selective speed provided for in the device, five in the present instance; 16, a detent-pin in the opposite wall of the casing and coöperating with detent-holes in disk 9, this pin not being a spring-pin and its purpose being to supplement the action of pin 15 to increase the stability with which the cage is held in selected position; 17, a series of studs parallel with each other and with the shafts of the system, these studs being firmly secured in the two disks of the cage and extending from disk to disk, the studs being arranged at varying distances from the axis of the cage; 18, a gear loose on one of these studs and seen in engagement with driving-pinion 5, in whose plane it is disposed; 19, a gear fast with gear 18 and seen in engagement with driven gear 6, in whose plane it is disposed, gears 18 and 19 together forming one of the selective compound gears of the system, which particular gear is shown as having been brought into action, meshing with the driving-pinion and driven gear; 20, a series of four other similar compound gears of varying sizes mounted upon studs 17, the cage thus carrying five selective compound gears any one of which can by properly adjusting the cage be brought to the active position between the driving-pinion and the driven gear, the other selective compound gears then being idle and out of engagement with either the driving-pinion or driven gear, gear sizes and the eccentricity of the cage being such as to bring about this condition as in the Burdick patent above referred to; 21, a large central hole in each disk of the cage to give plenty of room for journal-hubs projecting into the casing at driven shaft 3; 22, an inwardly-open circular groove in the central bore of disk 8; 23, an oil-groove extending lengthwise of each of the studs 17, these grooves presenting toward the axis of the cage and the studs being keyed into the cage, so that they may not turn; 24, oil-holes leading radially in disk 8 from groove 22 to the oil-grooves 23 of the studs, and 25 an oiler mounted on the casing and arranged to deliver oil into the groove 22.

The action of the device in transmitting selective speeds to the driven shaft from the driving-shaft running at constant speed is the same as in the Burdick patent. The cage of selective gears is very substantially supported, and the construction is such that the parallelism of the various shafts and studs can be maintained under the strains of heavy work and lubrication can be well insured. My commoner practice is to employ driving-shaft 4 as the shaft of a comparatively high-speed motor, and while I have spoken of shafts 4 and 3 as respectively the "driving" and "driven" shafts it is manifest that driving power may be applied to shaft 3, in which case shaft 4 would become the driven shaft.

I claim as my invention—

1. In multiple-speed gearing, the combination, substantially as set forth, of a circular casing having counterbores in the inner faces of its parallel walls, disks with their peripheries journaled in these counterbores, one of said disks having peripheral teeth, struts rigidly connecting the disks and with them forming a gear-cage, a shaft journaled in the casing and within and eccentric to said counterbores, a shaft journaled in the casing exterior to the counterbores, a gear disposed within the casing on one of said shafts in a fixed plane, a gear within the casing on the other of said shafts and in a different plane, studs carried by the cage, compound gears on said studs and arranged to be selectively engaged simultaneously with the gears on the two shafts, a spindle mounted in the casing, a pinion fast therewith and meshing with said teeth, a handle for turning said spindle, and a detent for holding the cage in adjusted angular position.

2. In multiple-speed gearing, the combination, substantially as set forth, of a circular casing having counterbores in the inner faces of its parallel walls, disks with their peripheries journaled in these counterbores, one of said disks having peripheral teeth, struts rigidly connecting the disks and with them forming a gear-cage, a shaft journaled in the casing and within and eccentric to said counterbores, a shaft journaled in the casing exterior to the counterbores, a gear disposed within the casing on one of said shafts in a fixed plane, a gear within the casing on the other of said shafts and in a different plane, studs carried by the cage, compound gears on said studs and arranged to be selectively engaged simultaneously with the gears on the two shafts, a spindle mounted in the casing, a pinion fast therewith and meshing with said teeth, a handle for turning said spindle, a detent-pin in one wall of the casing coöperating with one of the disks, and a detent-pin in the opposite wall of the casing and coöperating with the remaining disk.

3. In multiple-speed gearing, the combination, substantially as set forth, of a circular casing having counterbores in the inner faces of its parallel walls, disks with their peripheries journaled in these counterbores, one of said disks having peripheral teeth, struts rigidly connecting the disks and with them forming a gear-cage, a shaft journaled in the casing and within and eccentric to said counterbores, a shaft journaled in the casing exterior to the counterbores, a gear disposed within the casing on one of said shafts in a fixed plane, a gear within the casing on the other of said shafts and in a different plane, studs carried by the cage, compound gears on said studs and arranged to be selectively engaged simultaneously with the gears on the two shafts, a spindle mounted in the casing, a pinion fast therewith and meshing with said teeth, a handle for turning said spindle, a detent-pin in one wall of the casing and coöperating with one of the disks, and a spring detent-pin in the opposite wall of the casing and coöperating with the remaining disk.

4. In multiple-speed gearing, the combination, substantially as set forth, of a circular casing, a shaft journaled in the casing near the center thereof, a shaft journaled in the casing near the periphery thereof, gears fast on these two shafts, a disk journaled at one wall of the casing and provided with an inwardly-grooved central opening and with radial oil-passages leading from the groove, an oiler arranged to deliver to said grooves, a disk journaled in the opposite wall of the casing, struts uniting the disks and with them forming a cage, studs secured in the disks and having longitudinal grooves communicating with said radial oil-passages, compound gears on the studs arranged for coöperation with the first-mentioned gears, means for angularly adjusting the cage, and a detent for holding the cage in adjusted position.

WILLIAM J. HAGMAN.

Witnesses:
SAML. F. GIVIN,
W. G. PARSONS.